United States Patent [19]

Touchton et al.

[11] Patent Number: 4,967,291
[45] Date of Patent: Oct. 30, 1990

[54] METHOD AND APPARATUS FOR PREVENTING AN OVER-VELOCITY ERROR CONDITION OF A HARD DISK DRIVE SYSTEM

[75] Inventors: James J. Touchton, Boulder; Todd D. Baumann, Berthoud, both of Colo.

[73] Assignee: MiniScribe Corporation, Longmont, Colo.

[21] Appl. No.: 266,127

[22] Filed: Nov. 2, 1988

[51] Int. Cl.$^5$ ................................................. G11B 5/55
[52] U.S. Cl. .................... 360/78.04; 360/75; 369/32; 388/806; 388/815
[58] Field of Search .............. 360/75, 78.01, 78.04; 388/806, 815; 369/43, 44, 32

[56] References Cited

U.S. PATENT DOCUMENTS

| | | | |
|---|---|---|---|
| 3,568,059 | 3/1971 | Sordello | 324/177 |
| 3,883,894 | 5/1975 | Johnson | 446/92 |
| 4,246,536 | 1/1981 | Bradley et al. | 324/177 |
| 4,263,627 | 4/1981 | Rose et al. | 360/75 |
| 4,321,517 | 3/1982 | Touchton et al. | 318/618 |
| 4,622,516 | 11/1986 | Hearn et al. | 324/163 |

FOREIGN PATENT DOCUMENTS 59-177767 10/1984 Japan .

OTHER PUBLICATIONS

Jacob Millman, *Microelectronics*, 1979, McGraw-Hill Inc., pp. 579–580.

Primary Examiner—Alan Faber
Assistant Examiner—David L. Robertson
Attorney, Agent, or Firm—Curtis, Morris & Safford

[57] ABSTRACT

An apparatus for detecting an over-velocity error condition of a head actuator driven by a voice coil motor in a hard disk drive system includes an integrator for providing an integrated value of the current flowing through the voice coil motor and a detector for detecting when the integrated value exceeds a threshold value. In response to this detection, the supply of current through the voice coil motor is interrupted. To prevent false detections, the integrator is inhibited until the motor current reaches a level indicative of a track access operation.

17 Claims, 2 Drawing Sheets

OFF

THRESHOLD

METHOD AND APPARATUS FOR PREVENTING AN OVER-VELOCITY ERROR CONDITION OF A HARD DISK DRIVE SYSTEM

FIELD OF THE INVENTION

The present invention is directed generally to hard disk drive systems and more particularly is directed to a method and apparatus for preventing an over-velocity error condition of a hard disk drive system.

BACKGROUND OF THE INVENTION

In a hard disk drive system, also known as a rigid or Winchester disk drive system, it is advantageous to use rotary or linear voice coil motors as the driving element of a head actuator which moves the magnetic recording/reproducing heads across the disk surfaces. A voice coil motor is responsive to a current supplied therethrough to drive the head actuator with an acceleration proportional to the magnitude and direction of the current. The disk drive system uses the voice coil motor to perform, inter alia, a track access operation in which the magnetic heads are moved rapidly across the disk surfaces, skipping over, for example, hundreds of tracks, to quickly reach a desired track at which recording or reproduction will begin. In order to complete the track access operation as quickly as possible, the head actuator should be driven with maximum acceleration, and rotary voice coil motors have the desirable ability to provide high acceleration with small resistance, for example arising from back emf voltage.

As a result of this high acceleration, the maximum self-limiting velocity of the head actuator can be very high, and this creates a problem. In hard disk drive systems, the magnetic heads "fly" over the surfaces of the disks on an air cushion generated by the rotation of the disks themselves. When power is turned off, the head actuator is driven to move the magnetic heads to an information-free parking or landing zone on which they may rest without destroying information, which is recorded only in other areas of the disk. The magnetic heads should come to rest relatively softly, i.e. slowly, to the surface of the disk, or they may be damaged on impact. Typically, the head actuator brings the heads quickly to the parking zone in case of error or loss of power, and generally a crash stop pin is provided to limit further movement of the head actuator once it reaches the parking zone. It has been found, however, that if the head actuator is moving too fast when it hits the crash stop pin in a so-called over-velocity error condition, the negative acceleration of the actuator is excessive and causes the magnetic heads to crash to the disk surface.

OBJECTS AND SUMMARY OF THE INVENTION

Therefore, it is an object of the present invention to provide apparatus and a method for preventing an over-velocity error condition of a hard disk drive system which avoid the above-described difficulties of the prior art.

It is another object of the present invention to provide apparatus for preventing an over-velocity error condition of a hard disk drive system which operates electronically.

It is yet another object of the present invention to provide apparatus for preventing an over-velocity error condition of a hard disk drive system having a construction which is simple and inexpensive.

It is a further object of the present invention to provide apparatus and a method for preventing an over-velocity error condition of a hard disk drive system which prevent further acceleration of the head actuator in response to a detection that the velocity exceeds a threshold value.

Another object of this invention is to limit the velocity of the head actuation in a hard disk drive system when power is suddenly shut down, and by this to minimize the amount of disk surface area that otherwise must be dedicated to accommodate the landing of the heads.

It is still a further object of the present invention to provide apparatus and a method for preventing an over-velocity error condition of a hard disk drive system in which a continuous reset function is provided to avoid initial condition problems.

In accordance with an aspect of the present invention, apparatus and a method are provided for preventing an over-velocity error condition of a hard disk drive system in which a head actuator includes a voice coil motor that is driven by a current supplied thereto, an integrated value of the current being indicative of a contemporaneous velocity of the head actuator. An integrator integrates the current to provide an integrated value, but the integrator is controlled to be inactive, or "off", until the coil drive current reaches a predetermined minimum value. A detector detects if the integrated value exceeds a threshold value; whereupon a switch interrupts the supply of the current through the voice coil motor.

These and other objects, aspects and features of the present invention will become clear from the following detailed description of a preferred embodiment thereof taken together with the accompanying drawings, throughout which like reference numerals denote like elements and parts.

DETAILED DESCRIPTION OF THE PREFERRED EMBODIMENT

Figure 1:
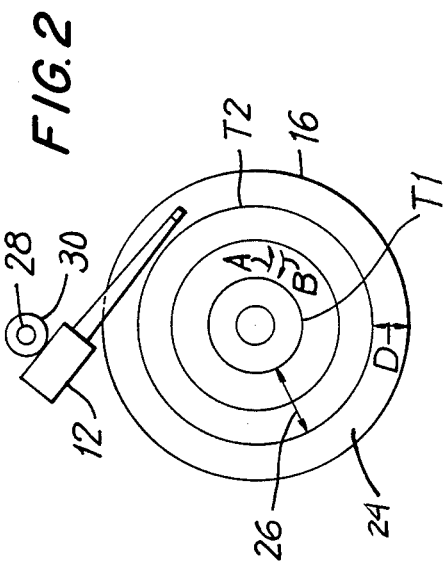
FIG. 1 is a schematic illustration of a hard disk drive system to which the present invention may advantageously be applied.
Figure 2:
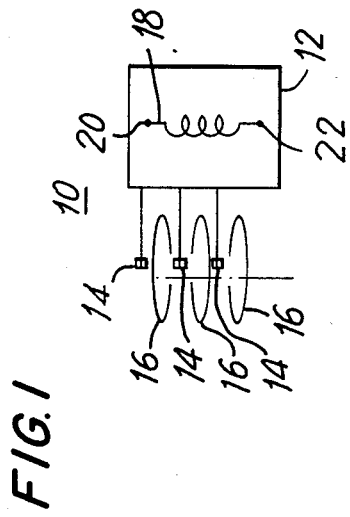
FIG. 2 is a top plan view of a hard disk useable in a hard disk drive system.

Turning now to the drawings and initially to FIGS. 1 and 2 thereof, a conventional hard disk drive system 10 to which the present invention may advantageously be applied includes a head actuator 12 on which is mounted one or more magnetic read/write heads 14. Heads 14 are adapted to read from and write on respective surfaces of one or more hard disks 16. As illustrated in FIG. 2, each of disks 16 includes information recorded in a plurality of generally circular tracks such as tracks T1 and T2. When more than one head 14 is provided, as shown in FIG. 1, heads 14 are ganged together to trace corresponding respective tracks on disks 16. Head actuator 12 includes a voice coil motor, schematically illustrated as coil 18, which supplies the driving power for moving head actuator 12 to position heads 14 over respective desired tracks on disks 16. In accordance with known techniques, coil 18 is responsive to a current of a first polarity, that is, a current passing through coil 18 from a first terminal 20 (FIG. 1) to a second terminal 22 to rotate head actuator 12 in a first direction, for example counterclockwise, and is further responsive to a current of a second polarity, that is, a current passing through coil 18 from second terminal 22 to first terminal 20, to rotate head actuator 12 in the opposite direction, for example clockwise. Although head actuator 12 is shown and described as a rotary actuator, the present invention may be used in conjunction with linear actuators.

In a forward track access operation, head actuator 12 is driven by coil 18 to rotate in a counterclockwise direction as shown by arrow A in FIG. 2 to move each head 14 from a position overlying track T1 to a position overlying track T2. In this forward track access operation, each head 14 rapidly skips over any number of tracks, from one to the maximum number of tracks recorded on disk 16 from the innermost to an outermost track. In a corresponding reverse track access operation, head actuator 12 is driven by coil 18 to rotate in a clockwise direction as indicated by arrow B to move head 14 from its position overlying track T2 to its position overlying track T1. It is of course desirable for head actuator 12 to perform its forward and reverse track access operations as quickly as possible, and so advantageously maximum acceleration is applied during the first portion of the access cycle and then optimal deceleration is applied during the last portion of that cycle to reach zero velocity over the desired track.

As is conventional in a hard disk drive system, heads 14 fly over their respective surfaces of hard disks 16 on an air cushion generated by the rapid rotation of disks 16. During power off conditions when system 10 is not in use, disks 16 are at rest and heads 14 lie on respective surfaces of their respective disks 16. In order to avoid damage to information recorded on the surfaces of disks 16, a special information-free annular parking zone 24 is provided on each surface of each disk 16 on which the respective head 14 may rest without the risk of destroying data therein. As shown in FIG. 2, the information-free annular zone 24 may be an outer annulus, with the information tracks being recorded in tracks T1 and T2 in an inner information annulus 26 of disk 16. Alternatively, parking zone 24 may be an inner annulus and information annulus 26 may be an outer annulus. In either case, head actuator 12 is designed upon an interruption in power, for example by actuation of a power on/off switch, to bring heads 14 to parking zone 24 before disks 16 stop rotating so that heads 14 will come to rest only within parking zone 24.

It is also known for systems such as hard disk drive system 10 to provide a "crash-stop" which limits the movement of head actuator 12 when heads 14 are rapidly brought to parking zone 24 to prevent any crashing of heads 14 on disks 16 where useful information may be recorded. The present invention is not directed to the structure of head actuator 12 or voice coil 18 or to the crash-stop per se, but rather is more particularly directed to an advantageous apparatus and method for preventing an over-velocity error condition of hard disk drive system 10.

As noted above, it is advantageous for head actuator 12 to perform its forward and reverse track access operations as quickly as possible. Voice coil motors including a voice coil such as coil 18 are advantageous in achieving rapid track access operations because they have the capability to provide high acceleration to head actuator 12. The acceleration is known to be proportional to the current passing through coil 18, while the direction of the acceleration is determined by the polarity of the current. Coil 18 is further advantageous in that it can provide this high acceleration while maintaining a low back emf voltage and hence low drag. Unfortunately, this advantageous high acceleration creates its own problem in that the self-limiting velocity of head actuator 12 may be too high. This self-limiting velocity is the maximum velocity which head actuator 12 will reach given constant application of the maximum acceleration thereto and will be limited by friction, back emf voltage, inertia and the like. If all goes well during a track access operation, this high velocity is not by itself a problem, since the corresponding amount of deceleration will be provided in the last portion of the operation to bring head actuator 12 to zero velocity over the desired track.

However, the track access operation may be interrupted before deceleration for a number of reasons, for example if the operator turns off the power on/off switch or if an error condition arises requiring movement of the actuator to its crash-stop position. One such error condition may be failure of the circuitry which provides the deceleration. In order to stop head actuator 12 when the deceleration circuitry fails, or for any other reason which calls for positioning the head actuator at its crash-stop position, a mechanical crash stop pin 28 (FIG. 2) is provided at the side of disks 16. Although not shown, two such crash stop pins may be provided: one to limit outer diameter movement of actuator 12 and one to limit inner diameter movement thereof. In one embodiment, crash stop pin 28 has an outer elastomeric surface 30 to contact head actuator 12. Surface 30 is intended to absorb the kinetic energy of moving head actuator 12. When pin 28 is contacted by actuator 12, the pin will deflect by a distance D. The faster head actuator 12 is moving when it hits crash stop pin 28, the larger the deflection distance D will be. Thus, it is desirable to limit the velocity of the actuator.

There is a significant difficulty which arises when head actuator 12 achieves an undesirably high velocity, which in the present specification is termed an over-velocity error condition. When head actuator 12 hits crash stop 28, crash stop 28 will deflect like a spring to control the deceleration to an allowable limit and thereby limit the physical shock to actuator 12 and prevent a head crash.

The relationship between the deflection of the crash stop, the initial velocity V of the head actuator and the peak deceleration applied to the head actuator by the crash stop is given by:

$$\Delta x = V^2/2 \cdot \text{Dec(peak)} \quad \text{for a preloaded crash stop.}$$
$$\Delta x = V^2/\text{Dec(peak)} \quad \text{for a non-preloaded crash stop.}$$

For the same initial velocity and the same peak deceleration, the preloaded crash stop yields one-half the distance required to stop the actuator than does the non-preloaded stop. This, obviously, is advantageous.

It has also been determined experimentally that the peak deceleration Dec(peak) should not be too large. An overly large peak deceleration has been found to disturb the flight characteristics of the head, causing it to crash to the surface of the disk and damage itself and the data recorded on the disk. Furthermore, the maximum deflection $\Delta x$ max) of the crash stop is limited by the limited room for deflection in the disk drive system. Therefore, the above equations demonstrate that, for fixed maximum deflection and peak deceleration, the velocity V should also be limited in order to prevent the head from crashing onto the disk.

A numerical example for a typical disk drive system will give an estimate of a maximum allowable velocity. Assume that the head actuator includes a voice coil motor and that the full supply voltage $V_A$ is applied for maximum current and hence maximum acceleration during a track seek operation. The supply voltage $V_A$ is conventionally 12 V. Assume that the motor torque constant is $K_T = 8$ oz-in/A, that the actuator inertia is $I = 200$ gm-cm$^2$ and that the radius of the actuator from pivot point to head is $r = 2.7$ in. Then the motor constant is $$K_M = K_T r/I = 7600 \text{ in/A-sec}^2$$

and the back emf voltage constant is $$K_b = 0.056 \text{ V-sec/rad}$$

The self limiting velocity of the head actuator is the velocity at which the back emf voltage equals the applied voltage, so that no current flows through the motor and no further acceleration occurs. Using the values above, the self-limiting velocity is $V_{SL} = V_A/K_b = 214$ rad/sec $= 578$ in/sec, seen at the head.

In the actual disk drive system, the maximum velocity attained in a normal track seek operation will be much lower than $V_{SL}$, and in fact is about 30 in/sec. Taking system tolerance variations into account, and for this example, a value of $V_{max} = 60$ in/sec was selected. The maximum deflection $\Delta x$(max) was selected as 0.05 in, based on dimensioning criteria. The peak deceleration for a preloaded crash stop was then $$\text{Dec(peak)} = (V_{max})^2/\Delta x \cdot 2$$
$$= 36.000 \text{ in/sec}^2.$$

This peak deceleration advantageously is less than the design limit for a typical head suspension assembly. It will be understood, of course, that different disk drive systems will have different parameters leading to different choices for $V_{max}$. In accordance with the present invention, a circuit for preventing an over-velocity error condition may be used with an appropriate $V_{max}$ to prevent velocities in excess thereof and thus to prevent head crashes.

Therefore, two objectives of the present invention are to minimize the travel distance D of head actuator 12 for a given peak deceleration (or negative acceleration) and to insure that the peak acceleration is below an allowable limit.

These objectives are achieved and the over-velocity error condition is prevented by electronically detecting when the velocity of head actuator 12 exceeds a predetermined threshold velocity and by then interrupting the supply of current through coil 18 in response to such detection. This constitutes an electronic limitation on the maximum velocity of head actuator 12 by cutting off further acceleration beyond the threshold velocity and normally due to a continued supply of current through coil 18. Since the current flowing through coil 18 during a head access operation is proportional to the acceleration imparted to head actuator 12, a properly initialized integrated value of the current will therefore be indicative of a contemporaneous velocity of head actuator 12. In accordance with the present invention, then, the current supplied through coil 18 is integrated to provide an integrated value and the supply of current through coil 18 is interrupted upon the detection that the integrated value exceeds a threshold value—but the integrator is not turned on until the current through the coil reaches a predetermined minimum value.

Figure 3:
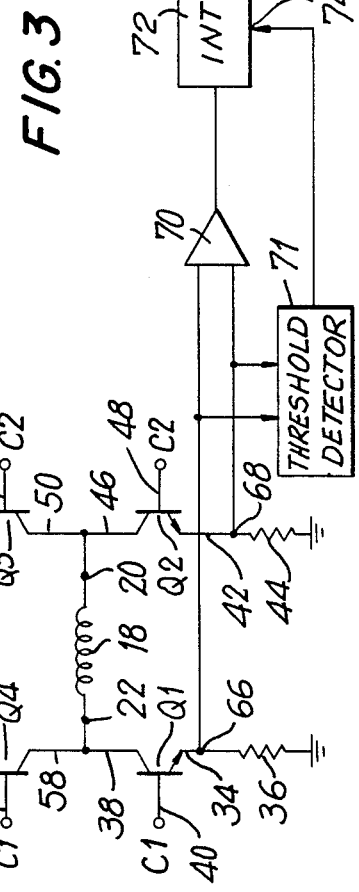
FIG. 3 is a schematic diagram of a preferred embodiment of the present invention.

As shown in FIG. 3, a preferred embodiment of the present invention has coil 18 connected in a switch arrangement 32 composed of four transistor switches Q1, Q2, Q3 and Q4. In the preferred embodiment, transistor switches Q1 and Q2 are NPN transistors and transistors Q3 and Q4 are PNP transistors; although it will be appreciated that all transistors may be NPN or PNP. Transistor switch Q1 has its emitter electrode 34 connected through a resistor 36 to ground, its collector electrode 38 connected to terminal 22 of coil 18 and its base electrode 40 connected to receive a first control signal C1. Transistor switch Q2 correspondingly has its emitter electrode 42 connected to ground through a second resistor 44, its collector electrode 46 connected to terminal 20 of coil 18 and its base electrode 48 connected to receive a second control signal C2. Transistor switch Q3 has its collector electrode 50 connected to terminal 20, its emitter electrode 52 connected to a power supply terminal 54 and its base electrode 56 connected to receive control signal C2. Transistor switch Q4 correspondingly has its collector electrode 58 connected to terminal 22, its emitter electrode 60 connected to power supply terminal 54 and its base electrode 62 connected to receive control signal C1. When control signal C1 is relatively high, control signal C2 is relatively low, and vice versa. Thus, transistor switches Q1 and Q3 are opened and closed together by control signals C1 and C2 being high and low and form a first switching circuit for providing and interrupting the supply of current of a first, forward polarity through coil 18 from first terminal 20 to second terminal 22. Transistor switches Q2 and Q4 are opened and closed together by control signals C2 and C1 being high and low and form a second switching circuit for providing and interrupting the supply of current through coil 18 in a second, reverse polarity from second terminal 22 to first terminal 20.

First and second control signals C1, C2 are supplied from a control circuit 64 which generally controls the operation and sequencing of hard disk drive system 10. Control circuit 64 may advantageously include a microprocessor or minicomputer mounted on a printed circuit board with other circuit elements described below. When head actuator 12 is to be moved in the counterclockwise direction indicated by arrow A in FIG. 2 to perform a forward track access operation, control circuit 64 outputs control signals C1 and C2 to close transistor switches Q1 and Q3 and to open transistor switches Q2 and Q4. In the preferred embodiment, control signals C1 and C2 also regulate the current through the conducting transistor switches. Current of the first, forward polarity flows from power supply terminal 54 through transistor switch Q3 to first terminal 20 of coil 18, through coil 18 to second terminal 22 and through transistor switch Q1 to emitter 32 thereof and to ground. Because transistor switches Q2 and Q4 are opened, substantially no current will flow through them.

Correspondingly, when head actuator 12 is to be driven in the direction of arrow B of FIG. 2 in a reverse track access operation, control signal C1 is set by control circuit 64 to a low voltage to open transistor switch Q1 and close transistor switch Q4; while control signal C2 is set by control circuit 64 to a high voltage to open transistor switch Q3 and close transistor switch Q2, so that current now flows from power supply terminal 54 through transistor switch Q4 to second terminal 22 of coil 18, through coil 18 to first terminal 20 and through transistor switch Q2 to emitter 42 thereof and to the ground. Now, since transistor switches Q1 and Q3 are open, substantially no current will flow therethrough. When head actuator 12 is not driven at all, either during power off conditions or when it is tracing a particular track, all four transistor switches Q1-Q4 are opened. Thus, at any one time, at most one voltage will be provided across resistor 36 or 44 and extracted from taps 66 and 68.

The voltages appearing at taps 66 and 68 are proportional to the currents through coil 18 and are fed, advantageously through an amplifier 70, to an integrating circuit 72, which integrates the amplified value of the current-proportional voltage to generate an integrated value. Ideally, the voltage received by integrating circuit 72 is directly proportional to the current that flows through coil 18 and is therefore of a magnitude and polarity indicative of the acceleration being applied to head actuator 12. Since the current itself is indicative of the acceleration of head actuator 12, the integrated value of this voltage will be indicative of a velocity of head actuator 12. However, because of an inherent offset voltage in amplifier 70 and currents flowing through the active circuits of integrating circuit 72, the integrating circuit may provide an erroneous output voltage even when no or little current flows through coil 18. If integrating circuit 72 is reset periodically to cancel this output voltage, a reset operation may interfere with a current detecting operation. Thus, the present invention proceeds by maintaining the integrating circuit off, or inoperative, that is, reset, until current through coil 18 reaches a predetermined minimum value. This is the function of threshold detector 71 coupled to each of taps 66 and 68.

The integrated value provided when integrating circuit 72 is enabled by threshold detector 71 is supplied to a detecting circuit 76 which also receives at a threshold input 78, or has stored within itself, a threshold value for the velocity of head actuator 12 which the actual velocity of head actuator 12 should not exceed. Control circuit 64 advantageously supplies the threshold value to detecting circuit 76 in the form of a THRESHOLD signal at threshold input 78. The magnitude of the threshold value at detecting circuit 76 is determined in accordance with the degree, if any, of amplification provided by amplifier 70. If detecting circuit 76 detects that the integrated value, indicative of the actual velocity of head actuator 12, exceeds the threshold value, indicative of the maximum desired actual velocity, then detecting circuit 76 sends an indication thereof to control circuit 64, which is responsive thereto to output both first and second control signals C1, C2 at voltage levels sufficient to open all four transistor switches Q1-Q4 and interrupt the supply of current through coil 18. Consequently, no further acceleration will be imparted by coil 18 to head actuator 12, and so the velocity of head actuator 12 will never rise above the predetermined threshold velocity. Hard disk drive system 10 is designed so that the integrated value will not exceed the threshold value unless an over-velocity error condition has occurred, for example by failure of the deceleration circuitry.

Upon detecting that the integrated value exceeds the threshold value, advantageously control circuit 64 will not continue with the track access operation. Thus, the present invention provides an electronic control to prevent an over-velocity error condition, which thereby permits the dimension of the deflection to be reduced and the radius of information zone 26 to be increased.

Figure 4:
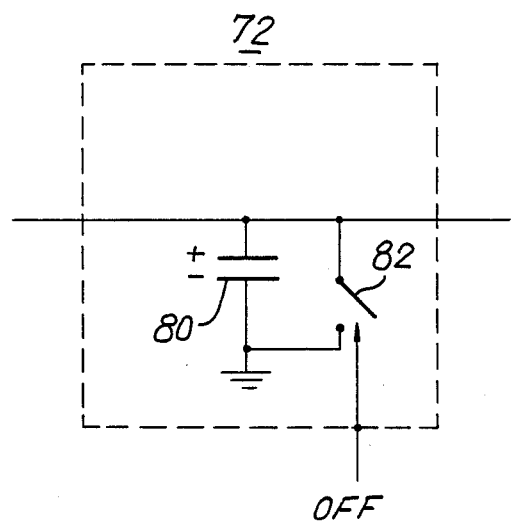
FIG. 4 is a partial wiring diagram of an integrating circuit of the preferred embodiment of FIG. 3.

FIG. 4 illustrates an advantageous integrating circuit 72 which includes a conventional integrating capacitor 80 for storing the integrated value thereon. Alternatively, the integrating circuit may be an active integrator, including an operational amplifier. The feature of disabling the integrating circuit, or turning it off, may advantageously be provided by a normally closed switch 82 connected to ground. Switch 82 is opened in response to a signal supplied from threshold detector 71 indicating that the current through coil 18, as represented by the voltage at tap 66 or tap 68, exceeds a threshold level, such as the current level normally sufficient to maintain the actuator at a track being followed. This level is exceeded when a track access operation is carried out. A closed switch 82 discharges capacitor 80, resetting and maintaining the integrated value stored thereon at zero, the initial value.

Figure 5:
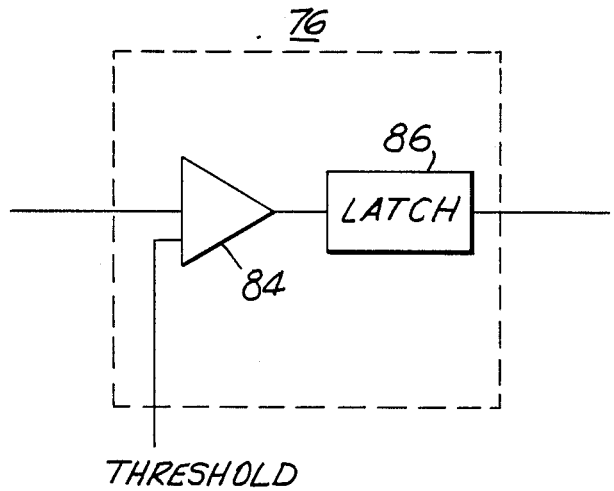
FIG. 5 is a partial wiring diagram of a detecting circuit of the preferred embodiment of FIG. 3.

FIG. 5 illustrates an advantageous detecting circuit 76 which includes a comparator 84 receiving at one input the integrated value and at another input the velocity threshold value to produce an output indicative of whether the integrated value exceeds the velocity threshold value. This output is applied to a latch 86 which in turn supplies its output to control circuit 64. Latch 86 is provided so that although transistor switches Q1-Q4 are opened as soon as the integrated value rises above the velocity threshold value, they will remain open even if the integrated value thereafter falls below the velocity threshold until a complete reinitialization of system 10 is completed.

When all four transistor switches Q1-Q4 are open, no net current will flow through coil 18. However, the offset of amplifier 70 and the small currents flowing in the active circuits of integrating circuit 72 will nevertheless be provided as a voltage to the integrating circuit. If integrating circuit 72 remains operable continuously, these small currents, when integrated over time may eventually exceed the velocity threshold value, or at the very least, prematurely trigger detector 76, thus resulting in the detection of an apparent over-velocity error condition which itself is erroneous. In order to avoid this problem, threshold detector 76 is operative to supply a RESET or OFF signal to reset input 74 to reset the integrated value to the initial value and to maintain that value until an access operation is carried out. It had been proposed heretofore to reset the integrating circuit periodically and to suspend the reset operation during a track access mode under the control of control circuit 64 when a track access is commanded. However, a failure in control circuit 64 could result in resetting integrating circuit 72 while the actuator is moving, thus defeating the ability to detect excess velocity.

Alternatively, control circuit 64 may be operative for resetting integrating circuit 72 only if the integrated value is less than a threshold value. This threshold value may correspond to that provided in threshold detector 71, and is less than an actual velocity value which head actuator 12 would reach after only a short period of acceleration and so the resetting would be unlikely to occur during a track access operation and even then would occur only at the very beginning of the track access operation when it would not create interference.

Nevertheless it is preferred that threshold detector 71 operate to detect when current through coil 18 exceeds a preset level, such as slightly above the current level normally needed to maintain a track following operation. As one numerical example, this threshold level may be on the order of about 40 mA. The high acceleration achieved by voice coil 18 will cause head actuator 12 to reach maximum velocity very quickly; and detecting circuit 76 detects when the integrated value is less than the velocity threshold value established by control circuit 64.

Detecting circuit 76 may be thought of as operating as a window circuit to permit a track access operation when the integrated value falls in the window between the low threshold value of threshold detector 71 and the velocity threshold value of the detecting circuit.

Alternatively or in addition to holding the integrating circuit OFF during non-access modes, integrating circuit 72 may be constructed so that the integrated value is continuously decreased towards the initial value so as to prevent the rise of the integrated value during quiescent or track-following conditions. This continuous decreasing function may be advantageously achieved by constructing the integrating capacitor 80 as a leakage element, that is, one which provides a resistive path to ground through which current may flow to continuously decrease the stored voltage on capacitor 80. If this type of continuously active resetting procedure is used and is operative even during track access operations, then the rate of decrease should be selected to be significantly less than the anticipated rate of increase of the integrated value during a track access operation. This will permit the integration during the track access operation to be accurately calculated, and the velocity threshold value of detecting circuit 76 may be adjusted to compensate therefor.

The present invention has been described in connection with a preferred embodiment, but it will be apparent to those of ordinary skill in the art that many changes and modifications may be effected therein without departing from the spirit and scope of the present invention, which is to be determined by reference to the appended claims.

What is claimed is:

1. Apparatus for preventing an overvelocity error condition of a hard disk drive system in which a head actuator is driven by a motor in response to a current supplied through the latter to carry out track access operations, an integrated value of said current being indicative of a contemporaneous velocity of said head actuator said apparatus comprising:
   integrator means for providing an integrated value of said current;
   detector means for detecting if said integrated value exceeds a velocity threshold value;
   switch means for interrupting the supply of said current through said motor in response to a detection that said integrated value exceeds said threshold value; and reset means for maintaining said integrator means at a reset condition even while current flows through said motor until the current through said motor exceeds a predetermined threshold level.

2. Apparatus according to claim 1 wherein said predetermined threshold level is slightly greater than the level of current through said motor for maintaining said head actuator at a desired track of said hard disk drive system.

3. Apparatus according to claim 2 wherein said reset means comprises threshold detecting means coupled to said motor for receiving a signal derived from the current actually supplied to said motor and for comparing said signal to said predetermined threshold level.

4. Apparatus according to claim 3 wherein said threshold detecting means inhibits the operation of said integrator means until said signal exceeds said predetermined threshold level, thereby inhibiting false detections by said detector means.

5. Apparatus according to claim 1, wherein said integrator means is continuously operative and wherein said reset means includes decreasing means for continuously decreasing said integrated value towards an initial value at least during times between track access operations.

6. Apparatus according to claim 5, wherein said integrator means includes capacitor means for storing said integrated value and said decreasing means includes means for creating a resistive path from said capacitor means to ground.

7. Apparatus according to claim 5, wherein said decreasing means continuously decreases said integrated value towards said initial value even during track access operations and at a rate substantially less than an anticipated rate of increase of said integrated value during a track access operation.

8. Apparatus according to claim 7, wherein said decreasing means is constituted by a leakage element in said integrator means.

9. Apparatus according to claim 1, further comprising amplifier means for receiving a signal proportional to said current from said motor and supplying an amplified current to said integrator means.

10. Apparatus according to claim 1, wherein said motor is responsive to current of a first polarity to drive said head actuator in a forward track access operation and is further responsive to current of a second polarity to drive said head actuator in a reverse track access operation, and wherein said switch means comprises first and second switch circuits for interrupting the supply of current of said first and second polarities, respectively, through said voice coil motor.

11. Apparatus according to claim 10, wherein said motor is a voice coil motor including first and second terminals, said current of said first polarity passing through said voice coil motor from said first terminal to said second terminal and said current of said second polarity passing through said voice coil motor from said second terminal to said first terminal, and wherein said first switch circuit includes a first switch connected between said second terminal and said integrator means and openable to interrupt the flow of current of said first polarity through said voice coil motor, and said second switch circuit includes a second switch connected between said first terminal and said integrator means and openable to interrupt the flow of current of said second polarity through said voice coil motor.

12. Apparatus according to claim 11, wherein said first switch circuit further includes a third switch ganged with said first switch and connected between said first terminal and a power supply terminal, and said second switch circuit further includes a fourth switch ganged with said second switch and connected between said second terminal and said power supply terminal.

13. Apparatus according to claim 11, wherein each of said first and second switches is a transistor switch which is closed to pass said currents of said first and second polarities during said forward and reverse track access operations, respectively.

14. Apparatus according to claim 1, wherein said integrator means includes capacitor means for storing said integrated value and said reset means includes means for inhibiting said capacitor means from charging.

15. A method for preventing an over-velocity error condition of a hard disk drive system in which a head actuator is driven by a voice coil motor in response to a current supplied through the latter, to carry out a track access operation, an integrated value of said current being indicative of a contemporaneous velocity of said head actuator, said method comprising the steps of:
   providing an integrated value of said current;
   maintaining said integrated value at an initial reset value while current flows through said motor until said current through said motor exceeds a predetermined threshold level whereafter said current is integrated; and
   interrupting the supply of current through said voice coil motor in response to a detection that said integrated value exceeds a velocity threshold value.

16. A method according to claim 15, further comprising the step of continuously decreasing said integrated value towards said initial value at a rate substantially less than an anticipated rate of increase of said integrated value during a track access operation.

17. A method according to claim 15, wherein said predetermined threshold level is slightly more than the current needed to operate said head actuator in a track-following mode.

* * * * *